United States Patent [19]

Gall, John C. et al.

[11] 4,185,400
[45] Jan. 29, 1980

[54] TYPEWRITER WITH INSTRUCTIONAL APPARATUS

[75] Inventors: Gall, John C., Chicago; Joseph H. Batogowski, Naperville; Albert F. Chamberlain, Lake Bluff, all of Ill.

[73] Assignee: Sears, Roebuck and Co., Chicago, Ill.

[21] Appl. No.: 933,146

[22] Filed: Aug. 14, 1978

[51] Int. Cl.² ............................................. G09B 13/00
[52] U.S. Cl. ............................................. 35/5; 35/6; 235/489
[58] Field of Search ................... 35/5, 6, 9 D, 9 A, 8; 235/489

[56] References Cited

U.S. PATENT DOCUMENTS

| | | | |
|---|---|---|---|
| 698,114 | 4/1902 | Herlt | 35/6 |
| 1,862,872 | 6/1932 | Vincent | 35/6 |
| 3,114,036 | 12/1963 | Andregg | 235/489 |
| 3,246,402 | 4/1966 | Diamond | 35/9 A |
| 3,494,051 | 2/1970 | Kobler | 35/5 |
| 3,536,178 | 10/1970 | Breidenbach | 35/5 |
| 3,729,081 | 4/1973 | Ozimek et al. | 400/216.1 |
| 3,840,106 | 10/1974 | Ikeda et al. | 400/321 |
| 3,862,679 | 1/1975 | Ozimek et al. | 400/697 |
| 3,866,736 | 2/1975 | Ozimek et al. | 400/697 |

FOREIGN PATENT DOCUMENTS 532461  10/1956  Canada ..................................... 35/69

*Primary Examiner*—John W. Shepperd
*Attorney, Agent, or Firm*—Arnstein, Gluck, Weitzenfeld & Minow

[57] ABSTRACT

A typewriter and the like utilized as an instructional aid device has control means for teaching alphabetical letter recognition, the sequence of letters in forming words and the association of a word to the picture of an object. A coded card, the preferred control means, carries the word related to the object, and optionally the picture of the object, and includes a series of perforations related to the word, which perforations are adapted to be penetrated by attachments carried on the key bars only when a key is struck in proper sequence. If an incorrect key is struck the device does not function. Card advancing means are provided to advance the card after each correct key is struck in proper sequence. In the absence of a control card, the typewriter and the like can be operated in a conventional manner.

12 Claims, 11 Drawing Figures

TYPEWRITER WITH INSTRUCTIONAL APPARATUS

BACKGROUND OF THE INVENTION

The present invention relates to an instructional aid device, such as a typewriter and the like having control means for teaching alphabetical letter recognition, the sequence of letters in forming words and optionally the association of a word to the picture of an object by restricting operation of the device to the striking of keys in proper sequence.

A typewriter or similar device having a keyboard displaying an alphabet has potential as an instructional aid since the alphabet is displayed to the student-operator and letters can be selected and printed merely by striking a proper key. However, the potential has not been fully realized with conventional typewriters because the striking of an incorrect key out of the proper sequence results in the printing of a character in the same manner as if a correct key or a key in the proper sequence had been struck. The conventional typewriter provides no immediate indication or feedback that a proper or improper key has been struck.

Attempts have been made to provide a toy or simplified teaching device by constructing a typewriter with only a few keys or where letters must be dialed prior to striking a key or print bar. However, these devices are in the nature of toys and cannot, as a practical matter, be utilized as a conventional typewriter.

Therefore, there is a need for a typewriter-like device that can be utilized as an instructional aid to provide immediate indication or feedback that a proper or improper key has been struck, which would further be useful as a conventional device either concurrently or upon completion of the instructional utilization of the device.

SUMMARY OF THE INVENTION

An object of the invention, therefore, is the provision of a device whereby a learner, such as a child, can be taught alphabetical letter recognition and association, the sequence of letters in forming words and optionally, the association of a word to a picture of an object.

Another object of this invention is the provision of a typewriter or similar device which can be utilized as an instructional aid for teaching alphabetical letter recognition and association and the sequence of letters in word formation, and can also be used in a conventional manner.

Still another object of the present invention is to provide a typewriter or similar device which can be used in the conventional manner or as an instructional aid with an immediate indication of whether a correct letter or a letter in a proper sequence has been selected.

Further objects and advantages of this invention will become apparent from the following description when the same is considered in connection with the accompanying drawings.

In accordance with the present invention, there is provided an instructional aid device, such as a typewriter, having type, type bars supporting the type, key controlled key bars, each connected to a type bar, control means for controlling the actuation of the type bars in accordance with coded information contained in the control means, and sensing means for sensing the presence of coded information in the control means for permitting operation of selected type bars in the presence of coded information and for preventing operation of other selected type bars in the absence of coded information in the control means.

Devices having type, type bars and key controlled key bars, the latter being pivotally mounted on at least one pin or rod, are conventional in the typewriter art. The present invention, however, includes control means, preferably in the form of a card having selected perforations providing coded information and adapted to be at least partially supported by the device for controlling the actuation of the type bars in accordance with the coded information, and sensing means for sensing the presence of coded information in the control means and for controlling the operation of the type bars as described above. The device can also include advancing means for advancing the control means following the striking of a correct key or a key in proper sequence. The advancing means is actuated upon operation of a universal bar, which in turn is adapted to be engaged by each of the key bars in the manner known to the art. Thus, the invention contemplates utilizing the elements and configuration of conventional typewriters and the like, with the addition of control means for controlling operation and sensing means for sensing the presence of coded information in the control means, and also advancing means and other means to be hereinafter described, the conventional elements operating as in a conventional typewriter or other device in the absence of the control means.

The invention is also directed to a coded card, which is the preferred form of control means for use in the described device. The card has selected perforations which provide the coded information and permit the operation of a type bar only upon the striking of a correct key within the proper sequence. As a teaching aid, the card can include the letters of the desired word in proper sequence, whereby correct recognition and association of the letters in proper sequence with the striking of corresponding keys in that sequence will result in the typing of the word by the device. In addition, a picture or drawing of an object associated with the word can also be present on the card as an aid to teaching association of the picture or drawing to the word. The perforations and graphic information can be present on the card prior to its use, or a card can be coded for teaching a desired word by an instructor or other individual for use with the device. A universal punch-out card is provided for this purpose as will be hereinafter described.

BRIEF DESCRIPTION OF A PREFERRED EMBODIMENT

Figure 1:
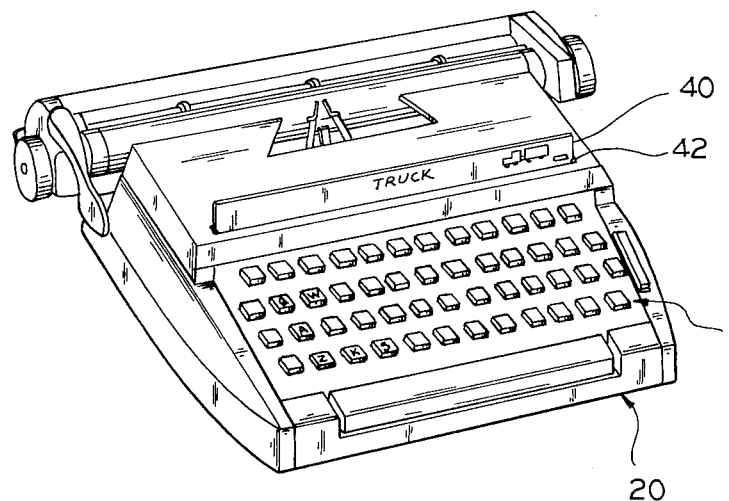
FIG. 1 is a perspective view of a device, in the form of a typewriter, in accordance with the present invention.

In the particular construction shown in the drawings, the numeral 20, indicates, generally, a device, in the form of a typewriter, in accordance with the present invention. In a conventional manner, device 20 has a keyboard 21 having a plurality of keys. As more particularly shown in FIG. 2, device 20, in the standard manner, has a plurality of rods 22, 23, 24 and 25, on which key bars 26, 27, 28 and 29, respectively, are pivotally mounted. As shown in relation to key bar 26, a key 21a is supported at one end of key bar 26, while the other end is connected to a type bar 30 by a link 31. Type bar 30 has a type supporting surface adapted to support a piece of type 32, for illustration, the letter T. Type bar 30 rotates upon rod 33 counterclockwise, as viewed in FIG. 2, to cause an imprinting of piece of type 32 upon the striking of key 21a through the movement of key bar 26 clockwise and link 31 to the left. Although not shown, it is understood that a similar key bar and type bar arrangement is present for each of the keys relating to the alphabet, numerals or punctuation in keyboard 21. Also shown in FIG. 2, as is conventional in typewriters of this general design, is a universal bar 34 rotatably journalled on rod 22 and adapted to be engaged by each of the key bars and rotated by them. For example, key bars 26-29 are positioned below the undersurface of universal bar 34 and will abut the rearward edge of bar 34 and cause the bar to rotate in the direction shown by arrow 35 upon the vertical displacement of the corresponding key supported by the key bar. As is known, a link 36 which controls as escapement mechanism (not shown) for spacing typed letters, numerals and punctuation, is secured to universal bar 34 for movement in the direction indicated by arrow 37 upon the rotation of bar 34 in the direction 35. Further, a spring 38 is attached to bar 34 from a portion (not shown) of device 20 to maintain the bar in the position shown except upon a key bar causing the bar to rotate, and thereafter to return the bar to the position indicated. The elements thus described are conventional in the typewriter art and, in the absence of control means to be described, can function in the ordinary manner of a typewriter.

Figure 8:
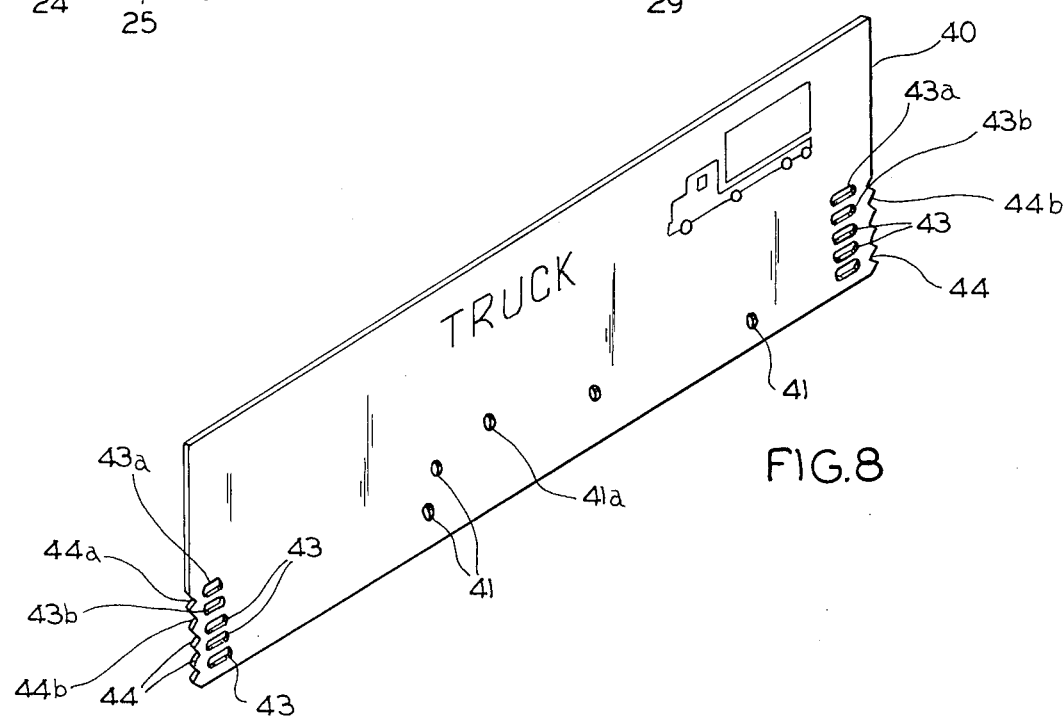
FIG. 8 is a perspective view of a coded card which can be utilized in the invention.

In accordance with the present invention, control means in the form of a control card 40 (FIG. 8) is provided for controlling the actuation of the type bars, such as type bar 30, in accordance with coded information in card 40. The coded information in card 40 appears as perforations 41, with a particular perforation referenced as 41a for illustration. Card 40 can be constructed of any substantially non-flexible material, such as card stock, cardboard or plastic, as shown. Card 40 is received in an elongated slot 42, in the body of device 20, as seen in FIG. 1. Card 40 is adapted to be at least partially supported by device 20 and preferably is supported so that indicia at the upper margin of card 40 is visible while the lower portion of the card is supported within the body of the device. Card 40 further has spaced apertures 43 positioned for cooperation with advancing means to be hereinafter described for advancing the card. At least two vertically spaced and aligned apertures are preferred, and it is further preferred to have two identical sets of apertures 43, with each set positioned along a side margin of card 40 to be acted upon concurrently for advancing the card while maintaining its alignment in the device. Card 40 also preferably includes indentations 44 in its side edges aligned with apertures 43 for use in yieldably holding card 40 at least partially within device 20. Perforations 41 in card 40 are vertically spaced with each perforation aligned with a pair of the apertures 43. For example, as shown in FIG. 8, the uppermost perforation 41a is aligned vertically with the pair of apertures 43a, 43a.

Figure 3:
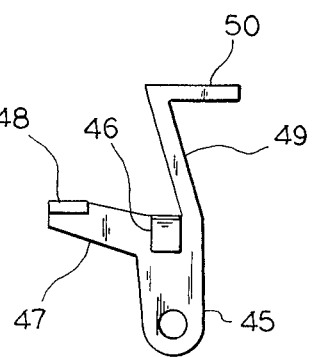
FIG. 3 is an elevational view of one element of the subassembly shown in FIG. 2.
Figure 2:
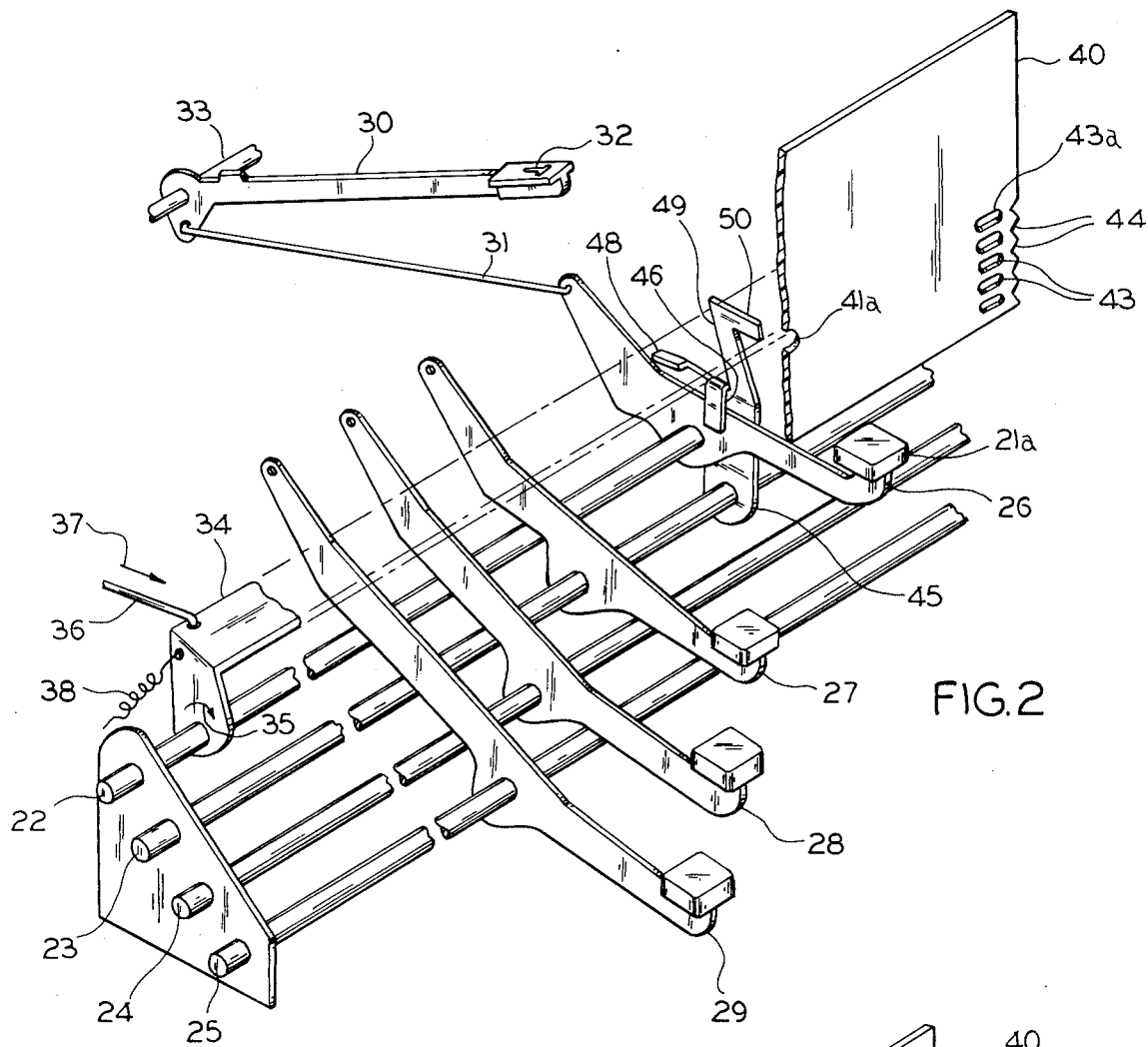
FIG. 2 is a fragmentary perspective view showing a subassembly of certain structural details of the device shown in FIG. 1.

In accordance with the present invention sensing means in the form of a plurality of lever-like, sensing members, such as member 45 in FIGS. 2 and 3 is provided for sensing the presence of coded information in card 40. One member is provided for each key bar, only member 45 in connection with key bar 26 being shown for the sake of brevity. Member 45 is pivotally journalled on rod 23. The other sensing members within the device are also pivotally journalled on rod 23. A tab 46 is provided on member 45 and is turned or bent over key bar 26 to maintain alignment therewith. Member 45 further includes an arm 47 supporting a flange 48 adapted to abut key bar 26 upon rotation of the key bar clockwise upon key 21a being depressed. Member 45 includes another arm 49 which supports a sensing probe 50 which is adapted to sense the presence of a perforation, such as 41, in a card 40 placed in the device. For this purpose, probe 50 is positioned so that upon operation it will pass through a perforation 41 in card 40 when the perforation is present and aligned therewith thus indicating the condition where coded information in the form of the perforation is present in the card. For the purpose of illustration, probe 50 is aligned with perforation 41a in card 40 when the card is initially positioned and held within device 20.

Figure 4:
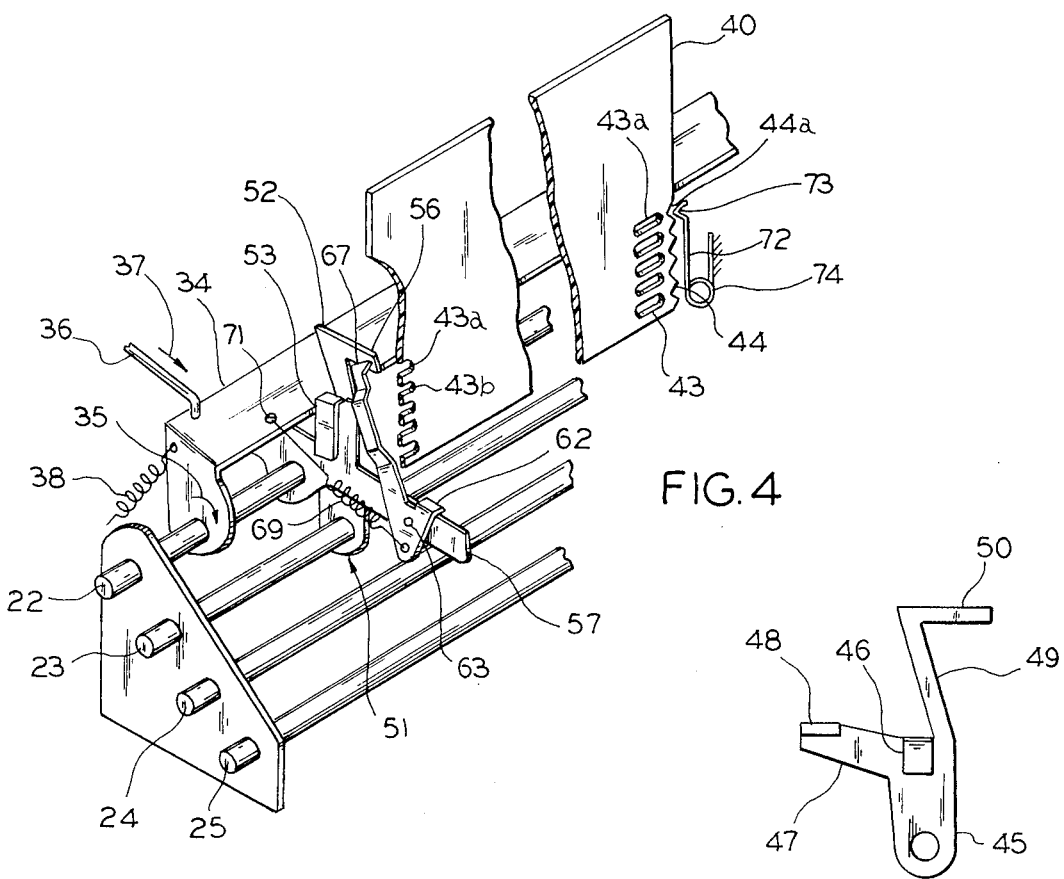
FIG. 4 is a view similar to FIG. 2 showing a subassembly of other structural details.
Figure 5:
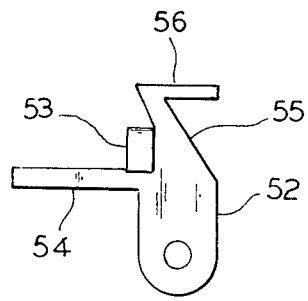
FIG. 5 is an elevational view of one element of the subassembly shown in FIG. 4.
Figure 6:
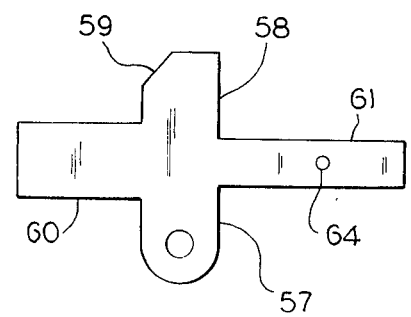
FIG. 6 is an elevational view of another element of the subassembly shown in FIG. 4.
Figure 7:
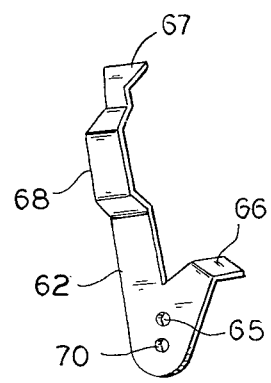
FIG. 7 is a perspective view of a pawl member of the subassembly shown in FIG. 4.

Further in accordance with the present invention, a card advancing assembly generally indicated by reference numeral 51 is provided for aligning card 40 and advancing the card following the striking of a proper key of keyboard 21 in the proper sequence. One element of assembly 51 is an aligning member 52 which is pivotally journalled on rod 23. Aligning member 52, as most clearly seen in FIG. 5 resembles sensing member 45 and has a tab 53, similarly positioned arms 54 and 55, and an aligning probe 56 supported by arm 55 adapted to pass through apertures 43. Tab 53 has a rear surface which can be contacted by the leading edge of universal bar 34 upon the bar being rotated about shaft 22. A second member of assembly 51 is a rocking member 57 (FIG. 6) pivotally journalled on rod 22 and held in alignment with aligning member 52 by means of tab 53 turned or bent over a portion of member 57, for example, a portion of arm 58. Arm 58 can be contacted by tab 53, for example, at angled rear portion 59, to impart movement to member 57. Rocking member 57 further includes an arm 60 the rearward portion of which is adapted to ride in a slot of a comb (not shown) which provides further stability and alignment to the assembly. A forward projecting arm 61 extends from rocking member 57 on which a pawl 62 (FIG. 7) is pivotally mounted by a fastener 63, such as a rivet, as shown, set in aligned holes 64 formed in rocking member 57, and 65 formed in pawl 62. Pawl 62 includes a flange 66 which normally abuts the upper surface of arm 61 of rocking member 57 to hold a beak 67 of the pawl spaced from card member 40. Beak 67 is positioned to enter an aperture 43 and cam card 40 to advance the card as will be hereinafter described. Beak 67 is supported by an arm 68 which may be offset as shown in FIGS. 4 and 7 to provide clearance for arm 58 and tab 53 of card advancing assembly 51. Pawl 62 is normally biased with flange 66 resting on arm 61 of rocking member 57 by a spring 69 which is hooked at one end to pawl 62 through a hole 70 formed therein and at the other end to universal bar 34 at hole 71 formed therein. Device 20 desirably has a second card advancing assembly, which may be identical to assembly 51 positioned proximate to the right hand side of universal bar 34 with the corresponding aligning probe and beak of the pawl adapted to pass into and cooperate with apertures 43 aligned along the right margin of card 40.

Figure 11:
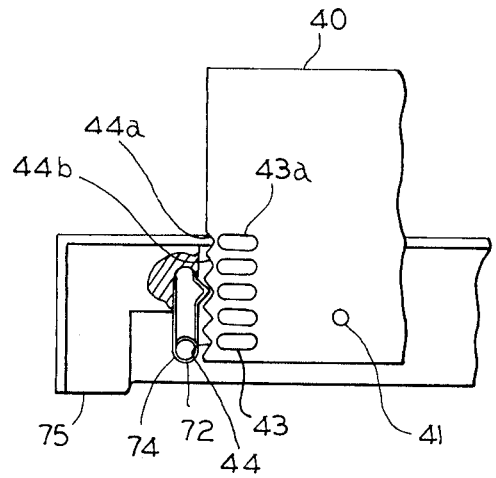
FIG. 11 is a fragmentary elevational view of a card and card holding apparatus in accordance with the invention.

Device 20 further includes retention means for yieldably holding card 40 at least partially within device 20. As shown in FIGS. 4 and 11, a wire spring 72 formed into a beak 73 and having a coil 74 to bias beak 73 toward a side edge of card 40, serves as the retention means. Wire spring 72 is retained within a portion 75 of the housing of device 20 which defines the elongated slot 42 into which card 40 is placed. Preferably a pair of wire springs 72 is provided, each positioned adjacent an end of slot 42. Upon insertion of card 40 into the device through slot 42, beak 73 of spring 72 contacts indentations 44 in card 40 and is alternately cammed away from the lower indentations by high points of the card between indentations, and is biased by coil 74 into the indentations, until beak 73 enters into the uppermost indentation 44a In operation as an instructional aid device, a card 40 having the desired word and optionally a corresponding picture or drawing along the upper marginal portion of the card is selected from a group of cards. As a first step in the learning process, the student may be instructed to select a card by visual recognition of the picture or word on the card. The selected card 40 is inserted into slot 42 and pushed downwardly until beaks 73 of wire springs 72 enter indentations 44a in the card. Card 40 is thus yieldably held with its lower portion within device 20.

Figure 9:
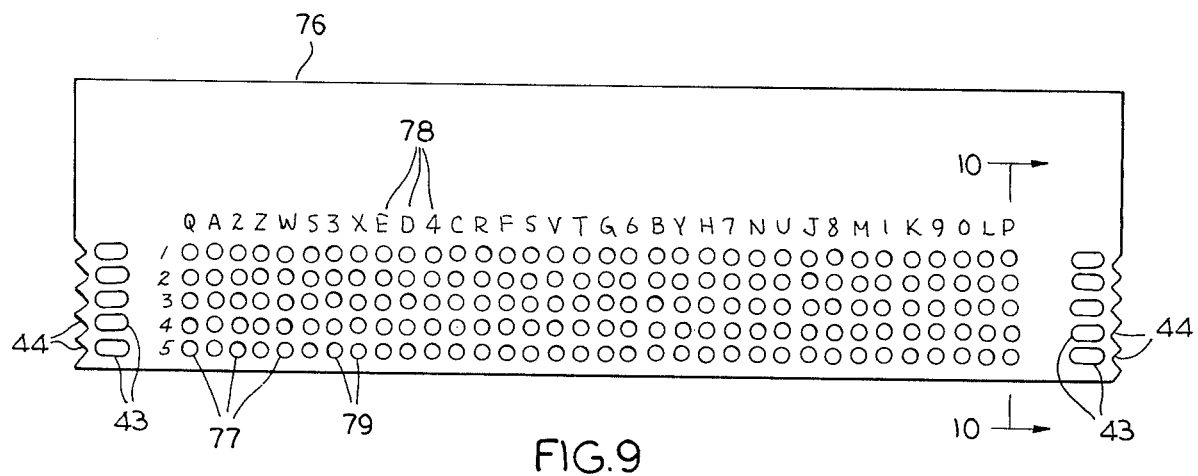
FIG. 9 is a front elevational view of a modified card which can be utilized in the invention.

After a sheet of paper has been inserted about the platen of the device and/or other steps preparatory to using a typewriter or similar device have been taken, the device is ready for use as an instructional aid. The student looks at the first letter of the word displayed on card 40, in FIGS. 1 and 9, T in word TRUCK for the purpose of illustration, and attempts to locate the corresponding key in keyboard 21. Upon locating and depressing a key, the downward motion of the key initially will cause clockwise movement of the key bar about one of the rods 22-25 causing the key bar to contact flange 48 of a sensing member 45 and thereafter continue its initial rotational movement with member 45 to the extent permitted by the member and its probe 50.

Initial actuation of a key bar, such as 26, causes initial actuation of universal bar 34 and card advancing assembly 51. Clockwise movement of the key bar, as viewed in FIG. 2, causes contact of the key bar with the rearward edge of universal bar 34 and causes initial rotation of bar 34 about rod 22 in the direction of arrow 35. The movement of the universal bar further causes a corresponding movement of aligning member 52 of assembly 51, about rod 23 since the leading edge of bar 34 abuts and imparts movement to the rear edge of tab 53 and hence member 57 and pawl 62. The movement of aligning member 52 about rod 23 causes its aligning probe 56 and beak 67 of pawl 62 to enter an aperture 43, in the case illustrated in FIG. 4, into upper aperture 43a. In this position, the presence of aligning probe 56 and beak 67 in aperture 43a provides alignment and stability to card 40 in addition to beak 73 of wire spring 42 holding card 40 at indentation 44a.

If the correct key, in this case key 21a, has been selected and depressed, its downward motion and the rotation of the keybar 26 would be allowed to continue since sensing probe 50 of member 45 held in alignment with key bar 26 will enter and pass into perforation 41a in card 40, the card being stabilized by probe 56 in aperture 43a. As sensing probe 50 enters into perforation 41a, link 31 is pulled to the right pivoting type bar 30 about rod 33 in cranking action, thereby imparting a velocity to type 32 which will cause the type to be imprinted, for example, through a ribbon, onto paper or other material at a platen.

If an incorrect letter is selected, i.e. any key in keyboard 21 other than key 21a corresponding to the letter T, the corresponding key bar would be rotated only until the key bar contacted the flange of the corresponding member and the latter pivoted about rod 23 until its sensing probe abutted the back of card 40. Further movement of the key bar supporting the key representing the incorrect letter would be prevented by the action of the probe being in abutment with the rear of card 40 and the flange of the member preventing further clockwise movement of the key bar. With the movement of the key bar being restricted, movement of the corresponding link and type bar would also be restricted and imprinting of the incorrect letter prevented.

Upon depression of the correct key, key 21a for the purpose of illustration, and the entering of probe 50 into perforation 41a, clockwise movement of key bar 26 about rod 22 continues and also causes universal bar 34 to continue its rotation about rod 22 in the direction shown by arrow 35 due to the contact of key bar 26 with the rearward edge of bar 34. The movement of universal bar 34 will cause movement of link 36 in the direction of arrow 37 resulting in the escapement mechanism providing its spacing function after typing of the letter T has been completed. The details of the escapement mechanism and the spacing function are known to the art and need not be further described. If an incorrect key had been selected and depressed, rather than key 21a, the movement of the corresponding key bar would be insufficient to cause more than initial contact of that key bar with the rearward edge of universal bar 34 and rotation of bar 34, so that actuation of the escapement mechanism and the resulting spacing funtion would not occur. Clearance between the forward edge of bar 34 and the flange and tab of the sensing members is provided so that not more than initial movement will be imparted to the elements of assembly 51 upon depressing any of the incorrect keys in keyboard 21.

Continued movement of universal bar 34 upon depressing a key in the proper sequence, in the illustrated case, key 21a, further causes rotation of rocking member 57 about rod 22 due to contact of the forward edge of bar 34 with the rear surface of tab 53 which in turn abuts portion of rear edge 59 of arm 58.

The movement of rocking member 57 about rod 22 through movement of universal bar 34, as described, will also cause beak 67 to retract from aperture 43 after its initial entry therein, since members 52 and 57 rotate about spaced apart rods and as a result probe 56 and beak 67 have different paths of movement. Due to its path of movement and the location of fastener 63 with respect to rod 22 about which rocking member 57 pivots, further movement of rocking member 57 causes the pawl 62 to lower with respect to aligning probe 56 in aperture 43a, the lower surface and point of beak 67 camming the beak out of aperture 43a and along the material of the card between apertures 43a and 43b until it can enter into aperture 43b, being biased toward that position by spring 69. Thus, at the condition of furthest travel of universal bar 34, aligning probe 56 has passed into aperture 43a and beak 67 of pawl 62 has entered into aperture 43b.

Following release of key 21a universal bar 34 returns to its rest position aided by the bias of spring 38. The return movement of bar 34 causes its undersurface to contact and move flange 48 downward rotating member 45 counterclockwise withdrawing sensing probe 50 from perforation 41a, and to contact and rotate arm 54 of sensing member 52 counterclockwise about rod 23 retracting aligning probe 56 from aperture 43a. During retraction of probe 56, beak 67 of pawl 62 remains in aperture 43b and maintains the position of rocking member 57. As universal bar 34 rotates counterclockwise, the force exerted by spring 69 increases, increasing the force on pawl 62. Upon probe 56 being retracted clear of aperture 43a, the force of spring 69 on pawl 62 causes an upward force exerted by beak 67 on the top surface of aperture 43b of card 40. As card 40 is pushed upwardly by beak 67 the surface beneath indentation 44a cams beak 73 of wire spring 72 toward and past the high point between the indentations 44a and 44b. As card 40 is advanced upwardly by the force exerted by beak 67 of pawl 62, rocking member 57 and pawl 62 rotate counterclockwise about rod 22 until flange 66 contacts arm 61 of member 57, whereupon further rotation of member 57 causes pawl 62 to retract its beak 67 from aperture 43b. Upon retraction of beak 67 from aperture 43b, wire spring 72 through its beak 73 cams the inclined surface above indentation 44b until beak 73 rests within the indentation causing card 40 to be retained in the new position. Upon beak 67 of pawl 62 and rocking member 57 being returned to their rest positions, the device is ready for the next sequence of operation with card 40 being yieldably retained with another perforation 41 being aligned with one sensing probe of a sensing member.

The sequence of operation described above for the first perforation 41a is continued for each of the letters indicated in the word appearing on card 40 with operation being permitted only when the keys in keyboard 21 are selected and depressed in proper sequence until all such keys have been depressed. In this manner, device 20 is operated only upon the selection and depression of keys in proper sequence, with operation being prevented upon the selection and depression of incorrect keys, i.e., keys not in the proper sequence.

Of course, by removal of card 40 from device 20, device 20 can be used in its conventional manner without being hindered by the additional elements heretofore described.

Figure 10:
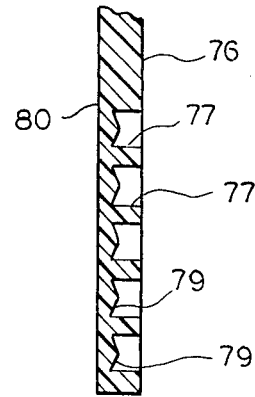
FIG. 10 is a fragmentary cross-sectional view of the card in FIG. 9 taken along line 10—10.

FIG. 10 illustrates a modified card 76 which may be used in the present invention in place of card 40. Card 76, which may be of the same material as card 40, has a series of tiers of partially cut-out perforations 77. Within the tiers are rows of perforations corresponding to the keys of keyboard 21 representing the letters of the alphabet and numberals, and optionally, the punctuation keys. Card 76 also has apertures and indentations corresponding to apertures 43 and indentations 44 for the purpose heretofore described in connection with card 40, and hence, the apertures and indentations have been given the same numerals. Card 76 preferably contains alpha-numeric designations 78 to aid an instructor or other individual in programming the card as an instructional aid. Card 76 also includes an unperforated portion near the top of its facing surface, as shown, on which letters of a word or other material can be drawn. Card 76 contains five tiers of perforations 77 affording the programming of the card for use in imprinting words or other units of information of up to and including five characters. To program card 76, the remaining material 79 in one perforation 77 in each tier is punched out through the use of a stylus, pencil or other instrument (not shown). Words or other units of information of less than five characters can be programmed into card 76 by utilizing as many lower tiers as necessary for each of the characters in the word or unit. Alternatively, the upper tiers of perforations 77 can be utilized and the side portions of card 76 including those apertures 43 and indentations 44 corresponding to the unused tiers of perforations 77 can be removed so that card 76 will not be advanced to a position where a tier of perforations 77 without a punched-out perforation is in alignment with sensing probes 50. It will be seen in FIG. 11 that those perforations 77 in which the punchable material 79 remain, presents a complete rear surface 80 to card 76 which upon contact with a sensing probe will not permit the operation of device 20 as heretofore described.

Various changes coming within the spirit of the invention may suggest themselves to those skilled in the art; hence, the invention is not limited to the specific embodiments shown and described and uses mentioned, but the same is intended to be merely exemplary, the scope of the invention being limited only by the appended claims.

I claim:

1. An instructional aid device comprising type, type bars supporting said type, key controlled key bars pivotally mounted on at least one rod and operatively connected to said type bars, control means for controlling the actuation of the type bars in accordance with coded information contained therein, and sensing means mounted on said one rod actuatable with each of said key bars for sensing the presence of coded information in said control means and for preventing operation of selected type bars in the absence of coded information in said control means.

2. The device of claim 1, wherein said sensing means comprises a plurality of members, one of said members being provided for each key bar, each of said members being pivotally journalled on said one rod, and having means for maintaining alignment with said key bar.

3. The device of claim 1, wherein said control means comprises a card having selected perforations providing coded information and adapted to be at least partially supported by said device.

4. The device of claim 3, wherein said sensing means comprises a plurality of members, one of said members being provided for each key bar, each of said members being pivotally journalled on said one rod, having means for maintaining alignment with said key bar, and having abutting means for abutting said key bar for movement therewith.

5. The device of claim 4, wherein each of said members further includes a sensing probe adapted to sense the presence of a perforation in said card and to pass therethrough.

6. The device of claim 1, having at least one other rod and a universal bar mounted for rotation on said one other rod and adapted to be engaged by said key bars for movement therewith, and further having advancing means mounted on said device and adapted for movement with said universal bar for advancing said control means.

7. The device of claim 6, wherein said control means comprises a card having selected perforations providing coded information adapted to be at least partially supported by said device and having spaced apertures positioned for cooperation with said advancing means to advance said card.

8. The device of claim 7, wherein said advancing means comprises an aligning member pivotally journalled on said one rod and having a portion secured to said universal bar for movement therewith and another portion adapted to align with a first aperture in said card and to pass therethrough and to withdraw therefrom; a rocking member pivotally journalled on said one other rod and maintained in alignment with said aligning member; and a pawl member pivotally journalled on said rocking member, biased toward said card and into abutment with said rocking member and having a beak adapted to enter a second aperture in said card and to advance said card upon said other portion of said aligning member having withdrawn from said first aperture.

9. The device of claim 8, wherein said card has at least two vertically spaced apertures positioned for cooperation with said other portion of said aligning member and with said beak of said pawl, and indentations in the side edges aligned with said apertures, and said device has retention means adapted to cooperate with said indentations in said card for yieldably holding said card at least partially within said device.

10. The device of claim 1, wherein said control means is a card having selected perforations providing coded information, at least two vertically spaced and aligned apertures, indentations in the side edges aligned with said aperture, and adapted to be at least partially supported by said device; said sensing means is a plurality of members, one member being provided for each key bar, each of said members being pivotally journalled on said one rod, having tab means for maintaining alignment of said member with said key bar, having abutting means for abutting said key bar for movement therewith, and having a sensing probe adapted to sense the presence of a perforation in said card and to pass therethrough; said device having at least one other rod and a universal bar mounted for rotation on said one other rod and adapted to abut said key bars for movement therewith; said device having card advancing means for advancing said card comprising an aligning member pivotally journalled on said one rod and having a portion secured to said universal bar for movement therewith and another portion adapted for alignmemnt with a first aperture in said card and to pass therethrough and to withdraw therefrom, a rocking member pivotally journalled on said one other rod and maintained in alignment with said aligning member, and a pawl member pivotally journalled on said rocking member, biased toward said card and into abutment with said rocking member, and having a beak adapted to enter a second aperture in said card and to advance said card upon said other portion of said aligning member being withdrawn from said first aperture; and biased retention means adapted to cooperate with said indentations in said card for yieldably holding said card at least partially within said device.

11. A control card for use with an instructional aid device having selected perforations providing coded information adapted to permit a probe to pass therethrough, at least two vertically spaced and aligned apertures adapted to permit a portion of an aligning member and a beak of a pawl member to pass therethrough, and means along the side edges thereof adapted for receiving biased retention means for yieldably holding said card at least partially within the device.

12. A punch-out control card for use with an instructional aid device havling a series of tiers of partially cut-out perforations each row within the tiers corresponding to one of the keys of a typewriter, vertically spaced apertures aligned with the tiers of partially cut-out perforations, and means along the side edges of the card for receiving biased retention means for yieldably holding said card at least partially within the device.

* * * * *